(12) United States Patent
Lee et al.

(10) Patent No.: US 7,102,793 B2
(45) Date of Patent: Sep. 5, 2006

(54) IMAGE FILTERING METHOD

(75) Inventors: Je-Ho Lee, Vancouver, WA (US); Jay S. Gondek, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 10/426,480

(22) Filed: Apr. 30, 2003

(65) Prior Publication Data

US 2004/0218829 A1 Nov. 4, 2004

(51) Int. Cl.
G06K 15/00 (2006.01)
(52) U.S. Cl. ............... 358/3.27; 382/260; 382/308
(58) Field of Classification Search ........... 358/1.9, 358/3.27; 382/260, 261, 263, 264, 254, 308
See application file for complete search history.

(56) References Cited

U.S. PATENT DOCUMENTS

2003/0108250 A1* 6/2003 Luo et al. ............... 382/263
2004/0091164 A1* 5/2004 Sakatani et al. ........... 382/254

OTHER PUBLICATIONS

Co-pending Hewlett-Packard Company, U.S. Application Serial No. 10/136,958, filed May 1, 2002, entitled "Parameterized Sharpening And Smoothing Method And Apparatus".

* cited by examiner

Primary Examiner—Thomas D. Lee

(57) ABSTRACT

A method of filtering an input image is provided. In a creating action, a boolean tone map is created based on the input image and an array of tone nodes. In a determining action, it is determined whether or not a target pixel is in a tone region by examining the target pixel and a neighboring region of pixels. If the target pixel is in a tone region, in a selecting action, a first base-filter is selected for the tone region. A method of resolution dependent filtering is also provided.

18 Claims, 6 Drawing Sheets

IMAGE FILTERING METHOD

Imaging devices, such as electrophotographic printers, inkjet printers, facsimile machines, multi-function devices, scanners, video cameras, televisions, and computer monitors are often used to reproduce or display digital images. In the case of devices like printers, the images are reproduced on a print media. For the purpose of this specification, a print media may refer to one or more sheets or rolls of a given print medium. Print media which may be imaged onto include, plain paper, coated papers, photo papers, transparencies, cloth, cardboard, plastics, and even metals.

A typical digital image contains pixilated color information which represents the image at a particular resolution. The resolution of the image may be expressed, for example, as a number of pixels per inch. The color information in a given pixel is typically encoded as a set of numbers which represent values in a particular color space. Due to the human eye's sensitivity to three main color wavelengths, namely red (R), blue (B), and green (G), the RGB color space is frequently used to represent color information for each pixel. Each of the millions of colors which may be perceived by humans can be represented as a mixture of varying amounts of red, blue, and green light. Other color spaces are known to those skilled in the art, but for the sake of explanation, it is sufficient to understand that each color in an entire color space of millions of colors may be represented by a small number of variables. Therefore, for example, the pixilated color information of a given digital image may be represented as RGB information.

In order to improve the reproduction or display of a digital image, the image is often filtered prior to such reproduction or display. Depending on the imaging device being used, fixed smoothing and/or sharpening algorithms have been applied to digital images based on spatial information such as local pixel variance and gradient. While improvements to reproduced or displayed image quality may be achieved through such filtering methods, they unfortunately may lead to misclassification of a local region. Additionally, by sharpening and smoothing with a fixed set of filters, a lower resolution image may receive over-sharpening or over-smoothing, and a higher resolution image may receive an insufficient level of sharpening or smoothing, thereby resulting in areas of poor image quality.

DETAILED DESCRIPTION OF THE PREFERRED EMBODIMENTS

Figure 1:
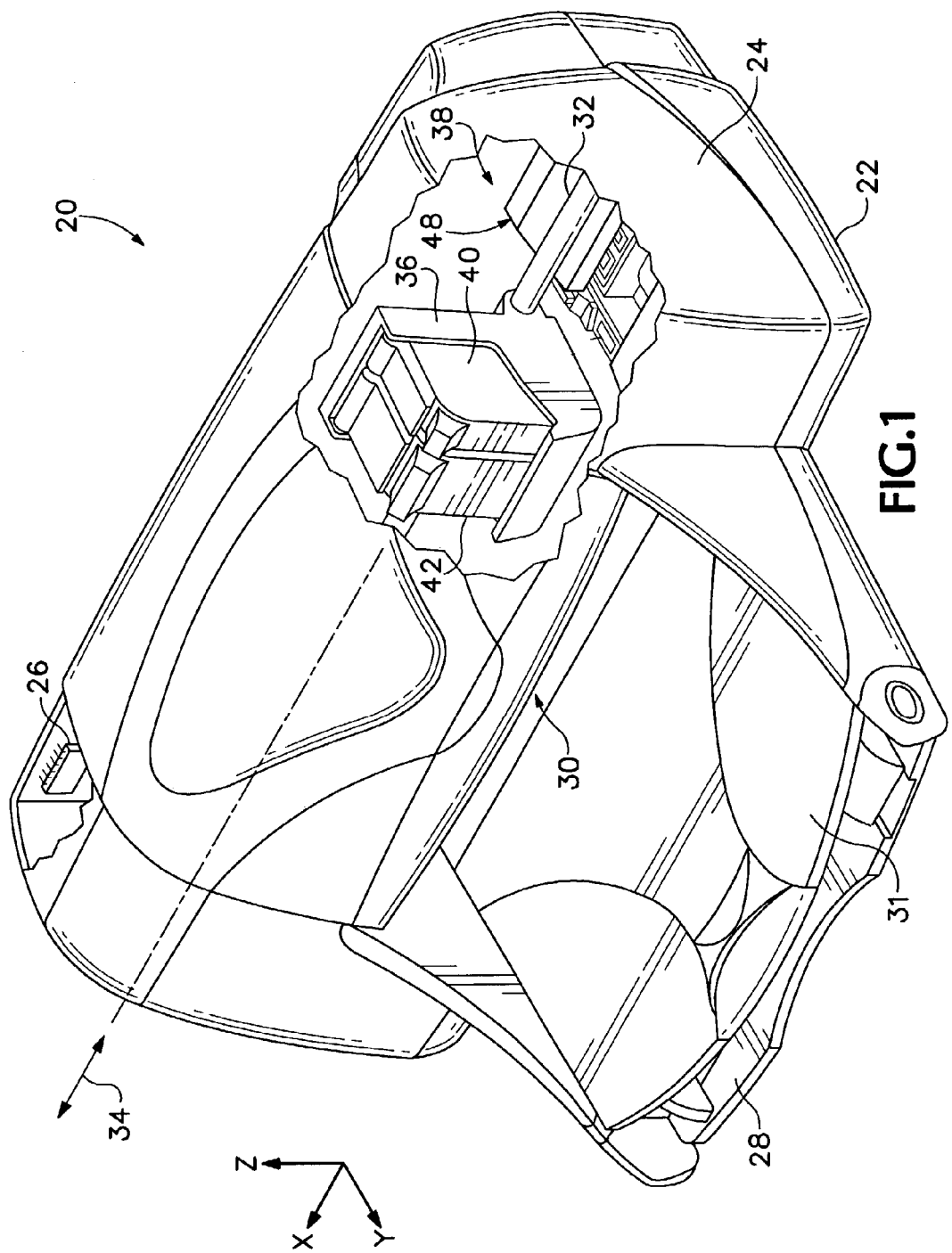
FIG. 1 illustrates one embodiment of an imaging device.

FIG. 1 illustrates an embodiment of an imaging device, here shown as an inkjet printer 20, which may be used for printing on a variety of media, such as paper, transparencies, coated media, cardstock, photo quality papers, and envelopes in an industrial, office, home or other environment. A variety of other imaging devices are commercially available. For instance, some of the imaging devices that may embody the concepts described herein include desk top printers, portable printing units, wide-format printers, electrophotographic printers, hybrid electrophotographic-inkjet printers, copiers, cameras, video printers, facsimile machines, video cameras, video monitors, televisions, and displays to name a few. For convenience the concepts introduced herein, which relate to the reproduction of digital images, are described in the environment of an inkjet printer 20.

While it is apparent that the printer components may vary from model to model, the typical inkjet printer 20 includes a chassis 22 surrounded by a frame or casing enclosure 24, typically of a plastic material. The printer 20 also has a printer controller, illustrated schematically as a microprocessor 26, that receives instructions from a host device, such as a computer or personal digital assistant (PDA) (not shown). A screen coupled to the host device may also be used to display visual information to an operator, such as the printer status or a particular program being run on the host device. Printer host devices, such as computers and PDA's, their input devices, such as a keyboards, mouse devices, stylus devices, and output devices such as liquid crystal display screens and monitors are all well known to those skilled in the art.

A print media handling system (not shown) may be used to advance a sheet of print media (not shown) from the media input tray 28 through a printzone 30 and to an output tray 31. A carriage guide rod 32 is mounted to the chassis 22 to define a scanning axis 34, with the guide rod 32 slidably supporting an inkjet carriage 36 for travel back and forth, reciprocally, across the printzone 30. A conventional carriage drive motor (not shown) may be used to propel the carriage 36 in response to a control signal received from the controller 26. To provide carriage positional feedback information to controller 26, a conventional encoder strip (not shown) may be extended along the length of the printzone 30 and over a servicing region 38. A conventional optical encoder reader may be mounted on the back surface of printhead carriage 36 to read positional information provided by the encoder strip, for example, as described in U.S. Pat. No. 5,276,970, also assigned to the Hewlett-Packard Company, the present assignee. The manner of providing positional feedback information via the encoder strip reader may also be accomplished in a variety of ways known to those skilled in the art.

In the printzone 30, the media sheet receives ink from an ink-jet cartridge, such as a black ink cartridge 40 and a color inkjet cartridge 42. The black ink cartridge 40 is illustrated herein as containing a pigment-based ink. For the purposes of illustration, color cartridge 42 is described as containing three separate dye-based inks which are colored cyan, magenta, and yellow, although it is apparent that the color cartridge 42 may also contain pigment-based inks in some implementations. It is apparent that other types of inks may also be used in the cartridges 40 and 42, such as paraffin-based inks, as well as hybrid or composite inks having both dye and pigment characteristics. The illustrated printer 20 uses replaceable printhead cartridges where each cartridge has a reservoir that carries the entire ink supply as the printhead reciprocates over the printzone 30. As used herein, the term "cartridge" may also refer to an "off-axis" ink delivery system, having main stationary reservoirs (not shown) for each ink (black, cyan, magenta, yellow, or other colors depending on the number of inks in the system) located in an ink supply region. In an off-axis system, the cartridges may be replenished by ink conveyed through a flexible tubing system from the stationary main reservoirs which are located "off-axis" from the path of printhead travel, so only a small ink supply is propelled by carriage 36 across the printzone 30. Other ink delivery or fluid delivery systems may also employ the systems described herein, such as replaceable ink supply cartridges which attach onto print cartridges having permanent or semi-permanent print heads.

The illustrated black cartridge 40 has a printhead 44, and color cartridge 42 has a tri-color printhead 46 which ejects cyan, magenta, and yellow inks. The printheads 44, 46 selectively eject ink to form an image on a sheet of media when in the printzone 30. The printheads 44, 46 each have an orifice plate with a plurality of nozzles formed therethrough in a manner well known to those skilled in the art. The nozzles of each printhead 44, 46 are typically formed in at least one, but typically two columnar arrays along the orifice plate. Thus, the term "columnar" as used herein may be interpreted as "nearly columnar" or substantially columnar, and may include nozzle arrangements slightly offset from one another, for example, in a zigzag arrangement. Each columnar array is typically aligned in a longitudinal direction perpendicular to the scanning axis 34, with the length of each array determining the maximum image swath for a single pass of the printhead. The printheads 44, 46 are illustrated as thermal inkjet printheads, although other types of printheads, or ink drop generators may be used, such as piezoelectric printheads. The thermal printheads 44, 46 typically include a plurality of resistors which are associated with the nozzles. Upon energizing a selected resistor, a bubble of gas is formed which ejects a droplet of ink from the nozzle and onto the print media when in the printzone 30 under the nozzle. The printhead resistors are selectively energized in response to firing command control signals delivered from the controller 26 to the printhead carriage 36.

Between print jobs, the inkjet carriage 36 moves along the carriage guide rod 32 to the servicing region 38 where a service station 48 may perform various servicing functions known to those in the art, such as, priming, scraping, and capping for storage during periods of non-use to prevent ink from drying and clogging the inkjet printhead nozzles.

In some embodiments, the controller 26 may receive digital information which makes up an input digital image. The controller 26, can then perform any filtering which is desired on the input digital image, as well as prepare the image filtered image for printing (reproduction or display) by the print cartridges 40, 42. Filtering of an image may include sharpening and/or smoothing techniques. In other embodiments, such image filtering and preparation may be done by a remote processor which is coupled to the printer 20, or may be split between the remote processor and the local controller 26. For the sake of explanation, the filtering and preparation of the image will be discussed as occurring on the local controller 26, however, it should be apparent to those skilled in the art the filtering techniques described herein, and their equivalents, may be implemented by different means.

Figure 2:
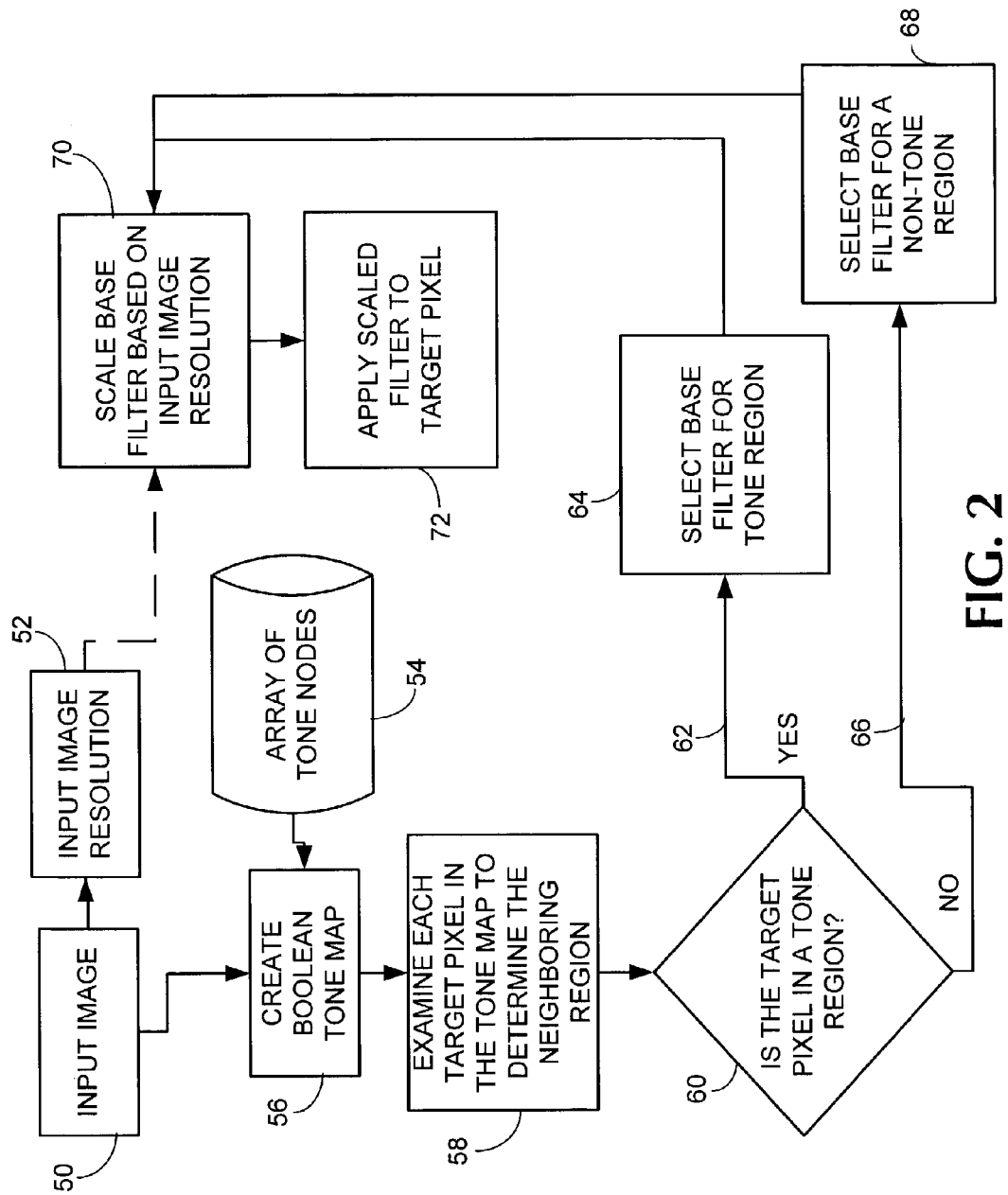
FIG. 2 schematically illustrates one embodiment of actions which may be taken to selectively sharpen or smooth an input image based on a tone map and an input image resolution.

FIG. 2 schematically illustrates one embodiment of actions which may be taken to selectively sharpen or smooth an input image 50 based on a tone map and an input image resolution 52. The input image resolution 52 is typically available as part of the digitally represented image. For example, if the input image 50 is saved in a JPEG format, the image resolution 52 is present in the JPEG file header. The input image 50 has a matrix of pixels, each pixel containing color information for that pixel. An array of tone nodes 54 is defined for a color tone set of interest in a color map. For example, the array of tone nodes 54 could be an array of skin tone nodes, an array of grass tone nodes, or an array of sky tone nodes. A boolean tone map is created 56 by comparing each pixel of the input image 50 with the array of tone nodes 54. If a given pixel in the input image 50 is located within the space defined by the array of tone nodes 54, then a corresponding value in the boolean tone map will be set to a first boolean value, for example, a value of "true". If the given pixel in the input image 50 is not located within the space defined by the array of tone nodes 54, then the corresponding value in the boolean tone map will be set to a second boolean value, for example, a value of "false". This process is repeated for each pixel in the input image 50 in order to create 56 the boolean tone map.

Each pixel in the boolean tone map is then treated as a target pixel, and examined to determine 58 the neighboring region. It is up to the designer of a particular filter to choose a neighboring region size and shape. For example, a neighboring region may include the eight pixels which surround a target pixel, plus the target pixel itself. A determination is made 60 of whether or not the target pixel is in a tone region. For example, in one embodiment, the target pixel might be deemed in a tone region if the target pixel itself and each of the pixels in the neighboring region (nine pixels altogether in this example) had a boolean tone value of true. In other embodiments, there might be some threshold percentage of the neighboring region which would need to be met with a boolean value of true in order for the target pixel to be deemed in a tone region. Through the definition of a particular sized neighboring region, treatment of a particular color tone can now be linked to the size of the region. For example, while it is generally considered beneficial to smooth skin tones, sharpening small skin tone areas, such as small faces may actually increase the visual appearance of an image.

If the target pixel is determined 62 to be in a tone region, then a base filter is selected 64 for the tone region. If the target pixel is determined 66 to not be in a tone region, then a base filter is selected 68 for a non-tone region. In other words, the filter is selected 68 without regard to what type of tone region is present for that pixel. Such a filters may look at spatial information, such as local variance and gradient. For example, in some embodiments, appropriate filters for the non-tone regions may be selected taking into account user supplied preferences for sharpening and smoothing as described in pending U.S. patent application Ser. No. 10/136,958, the specification of which is hereby specifically incorporated by reference.

Ideally, there would exist a filter optimized for each possible input image resolution 52. However, even a discrete set of filters for a series of likely image resolutions may take up a large amount of costly memory in an imaging device. Therefore, regardless of which base filter is selected 64, 68, it may be desirable to scale 70 the base filter based on the input image resolution 52. In addition to a set of base filters (the set containing smoothing, sharpening, and pass filters at a single resolution), the processor 26 of the imaging device may also have a set of filter scaling factors which allow scaling 70 of the base filters so the selected base filter for a target pixel may be optimized for the input image resolution.

For example, if the base filter is a 400 dpi (dots or pixels per inch) smoothing filter, and the input image has a 200 dpi resolution, too much smoothing would be applied to the image. The scale factor which could be applied to the base filter is not necessarily the ratio between the resolutions. Proper determination of filter scale factors will be discussed later in this specification with regard to FIG. 6. Finally, in the embodiment of FIG. 2, the scaled filter is applied 72 to the target pixel. The method illustrated in FIG. 2, and its equivalents, has the advantage that the global level of sharpening and/or smoothing is controlled by the input image resolution 52 and any available user sharpening/smoothing settings. It also has the advantage that the local level of sharpening and/or smoothing is controlled by the local spatial information as well as the color information from a particular array of tone color nodes 54.

Figure 3:
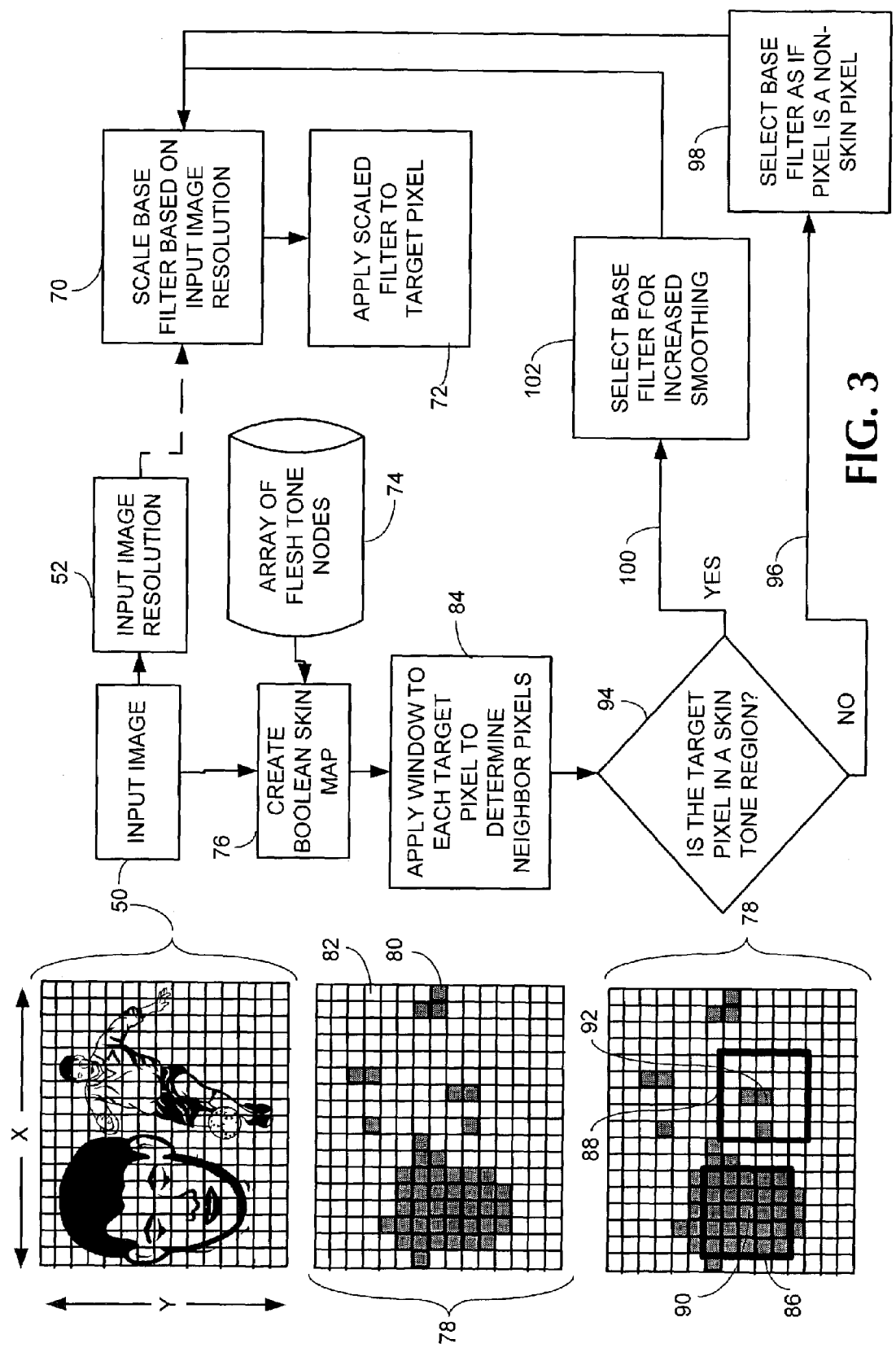
FIG. 3 schematically illustrates one embodiment of actions which may be taken to selectively sharpen or smooth an input image based on a skin tone map and an input image resolution.

FIG. 3 schematically illustrates one embodiment of actions which may be taken to selectively sharpen or smooth an input image based on a skin tone map and an input image resolution. An input image 50 has an input image resolution 52 as previously described. A schematic example of input image 50 is illustrated, the image having skin tone regions of varying sizes. The tone nodes of interest in this embodiment are skin tones. The controller 26 has an array of skin tone nodes 74 which are compared with the input image 50 to create 76 a boolean skin map 78. The illustrated boolean skin map 78 has locations which correspond to the pixel locations in the input image 50. Darkened squares 80 in the boolean skin map 78 represent a first value of "true" indicating a skin tone is present at the corresponding pixel location. Blank squares 82 in the boolean skin map 78 represent a second value of "false" indicating a skin tone is not present at the corresponding pixel location. While a processor 26 may likely implement the boolean map as an array of data, the visual representation shown in boolean skin map 78 is being used for the sake of explanation.

A window is applied to each target pixel to determine 84 the surrounding neighbor pixels. Two sample five-by-five windows 86, 88 are illustrated on the boolean skin tone map 78, each encompassing a target pixel 90, 92 respectively. While a five-by-five window is being used in this embodiment, the size and even the shape of the window may be varied as deemed appropriate by those skilled in the art, depending on a particular implementation. A determination is made 94 whether or not the target pixel belongs to a skin tone region. If the number of skin tone pixels within the window is below a certain threshold, then the target pixel is deemed not 96 to be in a skin tone region. In this case, a base filter is selected 98 as if the target pixel is a non-skin pixel. Examples of such filter selection may be found in U.S. patent application Ser. No. 10/136,958 which has been incorporated by reference. If the number of skin tone pixels exceeds the threshold, then the target pixel is deemed to be 100 in a skin tone region. In this case, a base filter may be selected 102 for increased smoothing, since skin tone regions may benefit from smoothing. Other embodiments may use two threshold levels, depending on the color of the target pixel. For example, if the value of the boolean skin map for the target pixel is "true" then a first threshold level may be used within the window where determination 94 of skin tone region is made. On the other hand, if the value of the boolean skin map for the target pixel is "false", then a second threshold level (which is less than the first threshold level) may be used within the window where determination 94 of the skin tone region is made. By using a second threshold level, other embodiments may reduce the chance of getting false positives or missing the skin tone detection.

As previously discussed, the base filter may be scaled 70 based on the input image resolution 52, and applied 72 to the target pixel. Proper determination of filter scale factors will be discussed later in this specification with regard to FIG. 6.

Figure 4:
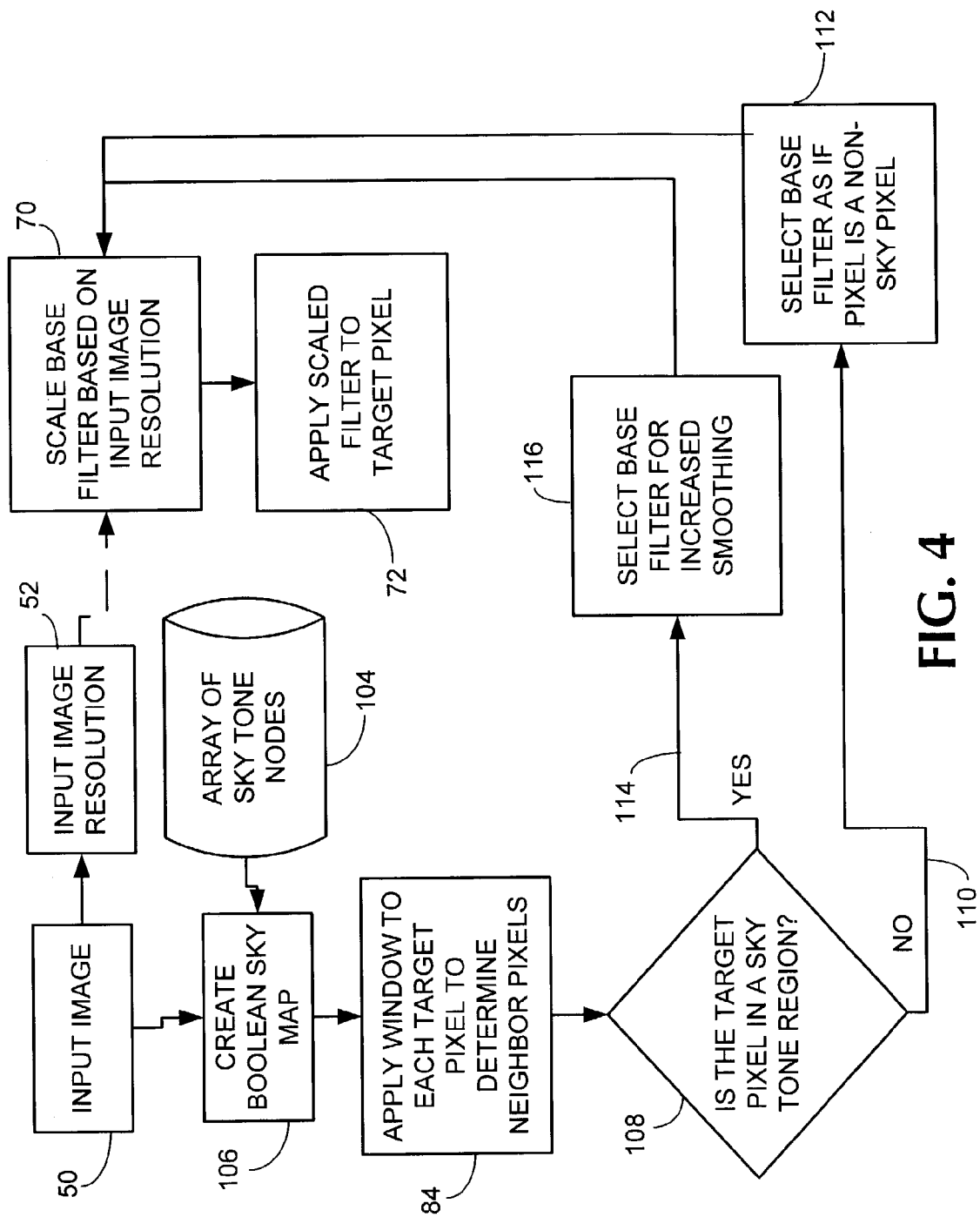
FIG. 4 schematically illustrates one embodiment of actions which may be taken to selectively sharpen or smooth an input image based on a sky tone map and an input image resolution.

FIG. 4 schematically illustrates one embodiment of actions which may be taken to selectively sharpen or smooth an input image based on a sky tone map and an input image resolution. An input image 50 has an input image resolution 52 as previously described. The tone nodes of interest in this embodiment are sky tones. The controller 26 has an array of sky tone nodes 104 which are compared with the input image 50 to create 106 a boolean sky map, similar to the boolean skin map 78 discussed previously. The boolean sky map has locations which correspond to the pixel locations in the input image 50.

A window is applied to each target pixel to determine 84 the surrounding neighbor pixels. The size and shape of the window may be varied as deemed appropriate by those skilled in the art, depending on a particular implementation. A determination is made 108 whether or not the target pixel belongs to a sky tone region. If the number of sky tone pixels within the window is below a certain threshold, then the target pixel is deemed not 110 to be in a sky tone region. In this case, a base filter is selected 112 as if the target pixel is a non-sky pixel. Examples of such filter selection may be found in U.S. patent application Ser. No. 10/136,958 which has been incorporated by reference. If the number of sky tone pixels exceeds the threshold, then the target pixel is deemed to be 114 in a sky tone region. In this case, a base filter may be selected 116 for increased smoothing, since sky tone regions may benefit from smoothing. Other embodiments may use two threshold levels, depending on the color of the target pixel. For example, if the value of the boolean sky map for the target pixel is "true", then a first threshold level may be used within the window where determination 108 of sky tone region is made. On the other hand, if the value of the boolean sky map for the target pixel is "false", then a second threshold level (which is less than the first threshold level) may be used within the window where determination 108 of sky tone region is made. By using a second threshold level, other embodiments may reduce the chance of getting false positives or missing the sky tone detection. As previously discussed, the base filter may be scaled 70 based on the input image resolution 52, and applied 72 to the target pixel. Proper determination of filter scale factors will be discussed later in this specification with regard to FIG. 6.

Figure 5:
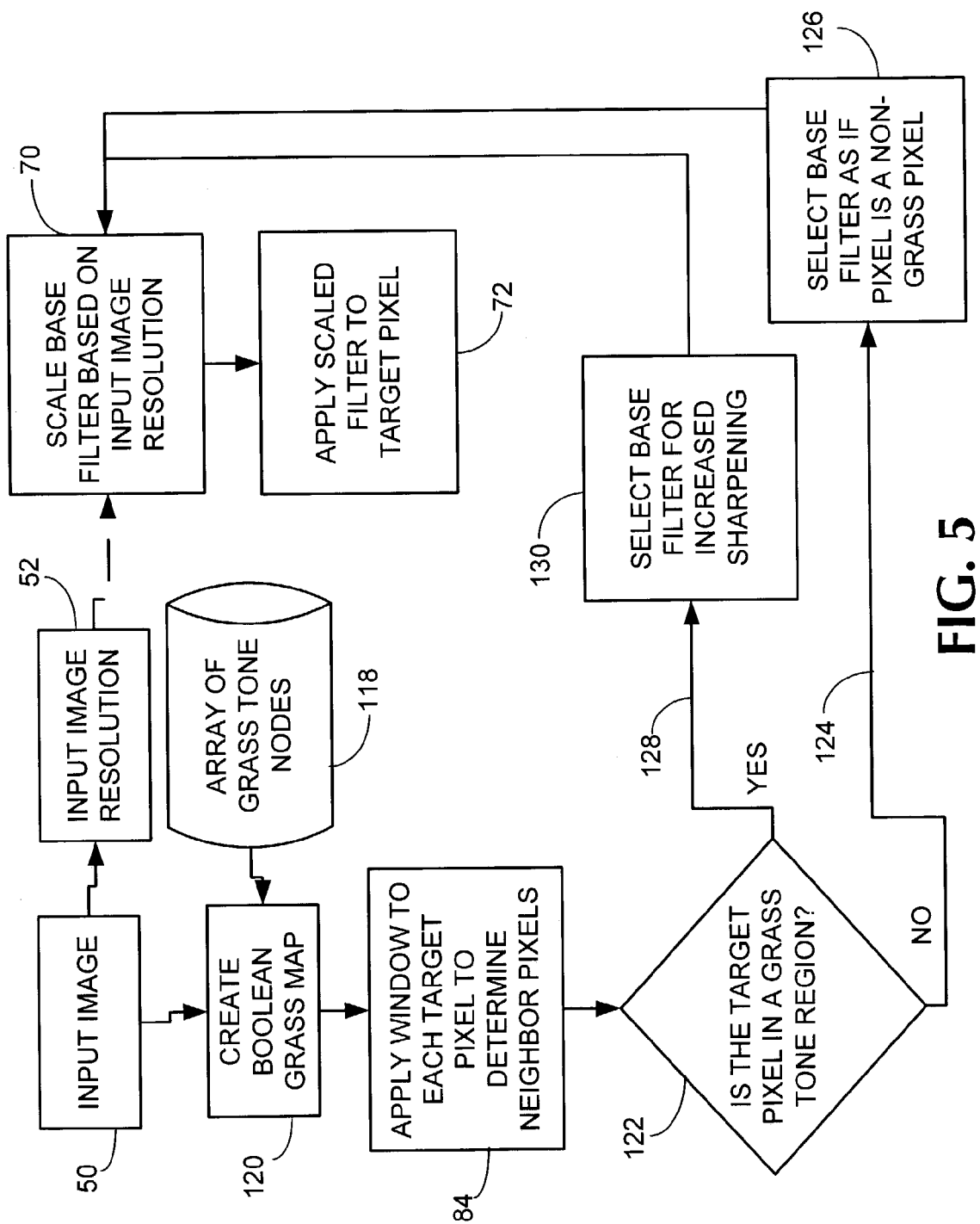
FIG. 5 schematically illustrates one embodiment of actions which may be taken to selectively sharpen or smooth an input image based on a grass tone map and an input image resolution.

FIG. 5 schematically illustrates one embodiment of actions which may be taken to selectively sharpen or smooth an input image based on a grass tone map and an input image resolution. An input image 50 has an input image resolution 52 as previously described. The tone nodes of interest in this embodiment are grass tones. The controller 26 has an array of grass tone nodes 118 which are compared with the input image 50 to create 120 a boolean grass map, similar to the boolean skin map 78 discussed previously. The boolean grass map has locations which correspond to the pixel locations in the input image 50.

A window is applied to each target pixel to determine 84 the surrounding neighbor pixels. The size and shape of the window may be varied as deemed appropriate by those skilled in the art, depending on a particular implementation. A determination is made 122 whether or not the target pixel belongs to a grass tone region. If the number of grass tone pixels within the window is below a certain threshold, then the target pixel is deemed not 124 to be in a grass tone region. In this case, a base filter is selected 126 as if the target pixel is a non-grass pixel. Examples of such filter selection may be found in U.S. patent application Ser. No. 10/136,958 which has been incorporated by reference. If the number of grass tone pixels exceeds the threshold, then the target pixel is deemed to be 128 in a grass tone region. In this case, a base filter may be selected 130 for increased sharpening, since grass tone regions may benefit from sharpening. Other embodiments may use two threshold levels, depending on the color of the target pixel. For example, if the value of the boolean grass map for the target pixel is "true", then a first threshold level may be used within the window where determination 122 of grass tone region is made. On the other hand, if the value of the boolean grass map for the target pixels is "false", then a second threshold level (less than the first threshold level) may be used within the window where determination 122 of grass tone region is made. By using a second threshold level, other embodiments may reduce the chance of getting false positives or missing the grass tone detection. As previously discussed, the base filter may be scaled 70 based on the input image resolution 52, and applied 72 to the target pixel.

Figure 6:
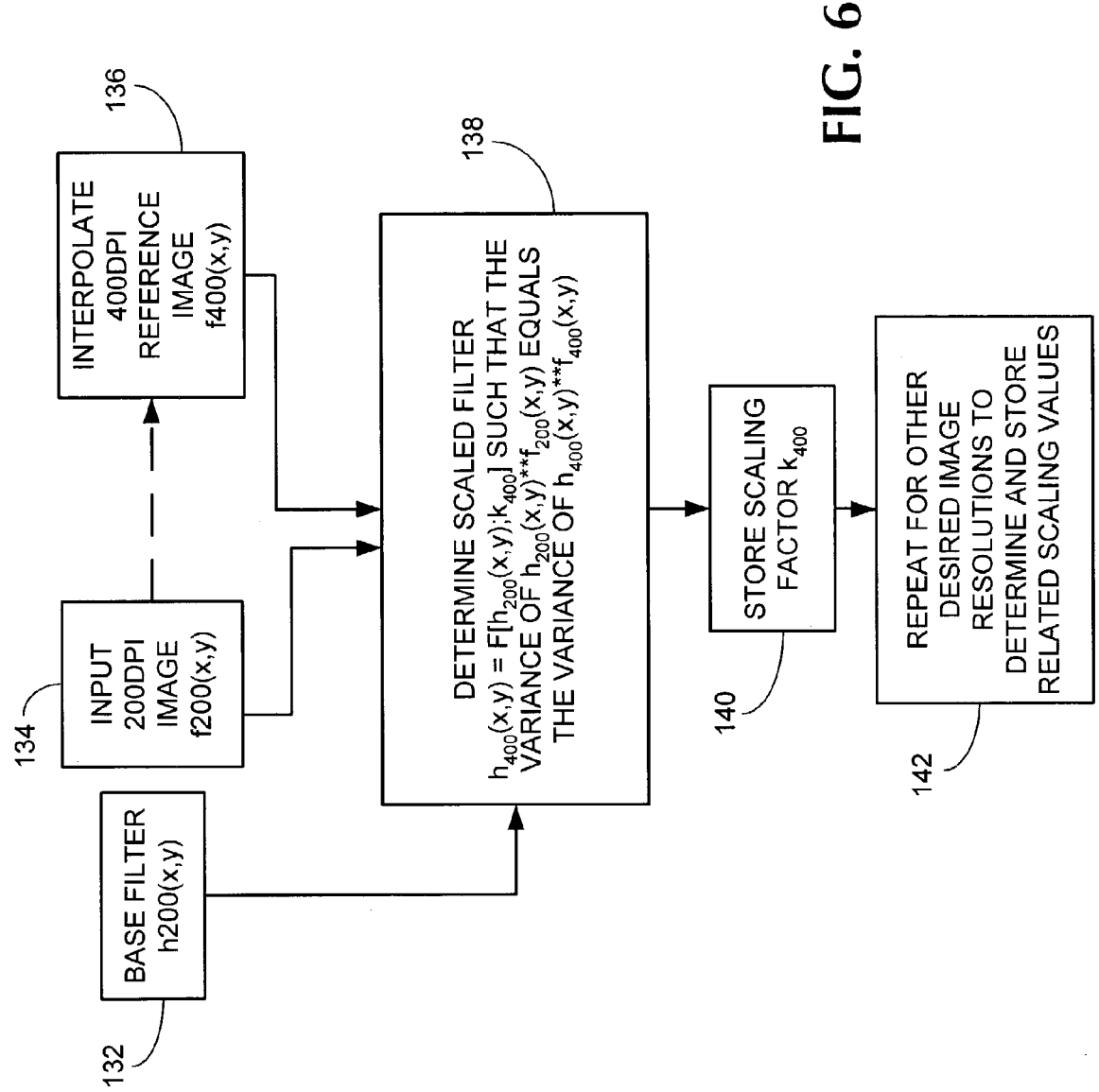
FIG. 6 schematically illustrates one embodiment of actions which may be taken to determine filter scaling factors.

FIG. 6 schematically illustrates one embodiment of actions which may be taken to determine filter scaling factors for a given base filter. In this embodiment, a base filter 132, optimized for a 200 dpi input image 134 is illustrated. The same techniques described with regard to this 200 dpi filter may be applied to other resolution base filters. The 200 dpi input image may be expressed as a function $f_{200}(x,y)$, where x and y are the horizontal and vertical coordinates of the pixels in the image, respectively. The 200 dpi base filter may be expressed as the function $h_{200}(x,y)$. In this embodiment, the scale factor for a 400 dpi image is being determined, however, the actions described may be applied to determine scale factors for any image resolution. Since a scale factor for a 400 dpi image is being determined, the 200 dpi image is interpolated to determine a 400 dpi reference image 136. The 400 dpi reference image 136 may be expressed as the function $f_{400}(x,y)$. The base filter 132, the input image 134, and the reference image 136 may be used to determine a scaled filter 138, which may be expressed as $h_{400}(x,y)$, wherein:

$$h_{400}(x,y)=F[h_{200}(x,y); k_{400}], \text{ such that:}$$

The variance of $h_{200}(x,y)f_{200}(x,y)$ substantially equals the variance of $h_{400}(x,y)f_{400}(x,y)$, wherein $k_{400}$ is the 400 dpi scale factor for the base filter, $F[h_{200}(x,y); k_{400}]$ is a function which maps $h_{200}(x,y)$ to $h_{400}(x,y)$ based on the scale factor $k_{400}$, and "**" denotes the two-dimension convolution. One example of such an $F[h_{200}(x,y); k_{400}]$ can be:

$$h_{400}(x,y)=k_{400}*h_{200}(x,y)-d(x,y)(k_{400}-1),$$

where $d(x,y)$ is the delta function. The scale factor $k_{400}$ may be stored 140, and the process may be repeated 142 for other desired image resolutions.

In practical application, with a base filter of 200 dpi, it may be desirable to precompute several scaling factors for a desired set of common resolutions, such as 100 dpi, 150 dpi, 300 dpi, 400 dpi, 500 dpi, and 600 dpi. These scale factors can be applied to determine a scaled filter based on the input image resolution. In the event that the input image resolution does not match either the base filter resolution or the resolutions for the scale factors, then an optimal scaling factor may be determined by the processor by interpolation of the scale factors according to the input image resolution.

Various advantages have been noted above. Methods for sharpening and/or smoothing more intelligently are made possible by examining the local color tone information in an image. Particular tones of interest, such as skin tones, sky tones, and/or grass tones, for example, may be filtered differently based on the size of corresponding tone regions in an image. While skin, grass, and sky tone regions have been described in various embodiments, an array of tone region nodes could be specified for virtually any set of tones desired. Additionally, resolution-dependent filtering may be implemented without having to store a different filter for each resolution of interest. It is apparent that a variety of other modifications and substitutions may be made to implement an image filtering method while still falling within the scope of the claims below.

We claim:

1. A method of filtering an input image, comprising:
   creating a boolean tone map based on the input image and an array of tone nodes;
   determining whether or not a target pixel is in a tone region by examining the target pixel and a neighboring region of pixels; and
   if the target pixel is in a tone region, selecting a first base-filter for the tone region;
   scaling the first base-filter based on an image resolution of the input image to create a scaled filter by determining a scale factor such that the scale factor may be used to map the base filter to the scaled filter; and
   applying the scaled filter to the target pixel;
   wherein the variance of the two-dimensional convolution of the input image and the scaled filter is substantially equal to the variance of the two-dimensional convolution of the first base-filter and an interpolated image of the input image having a resolution matching the resolution of the first base-filter.

2. The method of claim 1, further comprising:
   if the target pixel is not in a tone region, selecting a second base-filter for a nontone region.

3. The method of claim 2, further comprising:
   scaling the second base-filter based on an image resolution of the input image to create a scaled filter; and
   applying the scaled filter to the target pixel.

4. The method of claim 1, wherein determining the scale factor comprises:
   interpolating the scale factor from pre-computed scale factors for various resolutions, based on the input resolution.

5. An imaging device comprising a processor configured to implement the method of claim 1.

6. The method of claim 1, wherein the array of tone nodes comprises an array of skin tone nodes, and the boolean tone map comprises a boolean skin tone map.

7. The method of claim 6, wherein the first base-filter comprises a smoothing filter.

8. The method of claim 1, wherein the array of tone nodes comprises an array of grass tone nodes, and the boolean tone map comprises a boolean grass tone map.

9. The method of claim 8, wherein the first base-filter comprises a sharpening filter.

10. The method of claim 1, wherein the array of tone nodes comprises an array of sky tone nodes, and the boolean tone map comprises a boolean sky tone map.

11. The method of claim 10, wherein the first base-filter comprises a smoothing filter.

12. An imaging device comprising a processor configured to implement the method of claim 1.

13. The method of claim 1, wherein determining whether or not a target pixel is in a tone region further comprises:
- applying a window to the target pixel in the boolean tone map to determine the neighboring region of pixels;
- determining a number of pixels in the window which have a first boolean tone value from the boolean tone map;
- comparing the determined number of pixels in the window having the first boolean tone value with a threshold number of pixels; and
- if the determined number of pixels in the window having the first boolean tone value is greater than the threshold number of pixels, designating the target pixel as being in a tone region.

14. The method of claim 13, wherein:
- the threshold number of pixels is a first threshold number of pixels if a boolean tone value for the target pixel is equal to the first boolean tone value; and
- the threshold number of pixels is a second threshold number of pixels if the boolean tone value for the target pixel is not equal to the first boolean tone value.

15. The method of claim 14, wherein the first threshold number of pixels is greater than the second threshold number of pixels.

16. A method of filtering an input image, comprising:
- creating a boolean tone map based on the input image and an array of tone nodes;
- determining whether or not a target pixel is in a tone region by examining the target pixel and a neighboring region of pixels;
- if the target pixel is in a tone region, selecting a first base-filter for the tone region, if the target pixel is not in a tone region, selecting a second base-filter for a nontone region;
- scaling either the first or second base-filter based on an image resolution of the input image to create a scaled filter; and
- applying the scaled filter to the target pixel;
- wherein the variance of the two-dimensional convolution of the input image and the scaled filter is substantially equal to the variance of the two-dimensional convolution of the first base-filter and an interpolated image of the input image having a resolution matching the resolution of the first base-filter.

17. A method of resolution dependent filtering, comprising:
- applying a scaling factor based on an a first image resolution to a base resolution filter of a second resolution to determine a scaled resolution filter; and
- applying the scaled resolution filter to an input image of the first image resolution;
- wherein the scaling factor is determined by computing a scaled filter defined by the scaling factor and the base resolution filter such that the variance of the two-dimensional convolution of the base resolution filter and an image of the second resolution is substantially equal to the variance of the two-dimensional convolution of the scaled filter and an image of the first resolution, wherein the image of the first resolution is an interpolated version of the image of the second resolution.

18. The method of claim 17, wherein the scaling factor is determined by interpolating between precomputed scaling factors for some known resolutions.

* * * * *